United States Patent
Hill et al.

(10) Patent No.: US 11,675,524 B2
(45) Date of Patent: Jun. 13, 2023

(54) ISOLATED HARDWARE DATA SANITIZE SYSTEM AND METHOD

(71) Applicant: Crystal Group, Inc., Hiawatha, IA (US)

(72) Inventors: Adrian A Hill, Cedar Rapids, IA (US); John M Flender, Hiawatha, IA (US); Michael A Steffen, Cedar Rapids, IA (US)

(73) Assignee: Crystal Group, Inc., Hiawatha, IA (US)

( * ) Notice: Subject to any disclaimer, the term of this patent is extended or adjusted under 35 U.S.C. 154(b) by 0 days.

(21) Appl. No.: 17/404,689

(22) Filed: Aug. 17, 2021

(65) Prior Publication Data
US 2022/0050617 A1     Feb. 17, 2022

Related U.S. Application Data

(60) Provisional application No. 63/066,558, filed on Aug. 17, 2020.

(51) Int. Cl.
    *G06F 3/06*           (2006.01)
    *G06F 21/60*         (2013.01)

(52) U.S. Cl.
CPC .......... *G06F 3/0652* (2013.01); *G06F 3/0623* (2013.01); *G06F 3/0674* (2013.01); *G06F 21/602* (2013.01); *G06F 2221/2143* (2013.01)

(58) Field of Classification Search
CPC .... G06F 3/0623; G06F 3/0652; G06F 3/0673; G06F 3/0674; G06F 3/0679; G06F 21/60; G06F 21/602; G06F 2221/2143
USPC .................................. 711/111, 152, 161, 163
See application file for complete search history.

(56) References Cited

U.S. PATENT DOCUMENTS

| | | | |
|---|---|---|---|
| 5,438,622 A | 8/1995 | Normile et al. | |
| 6,324,287 B1 | 11/2001 | Angert | |
| 7,382,883 B2 | 6/2008 | Cross et al. | |
| 7,461,406 B2 | 12/2008 | Pelly et al. | |
| 8,011,005 B2 | 8/2011 | Cruzado et al. | |
| 8,189,790 B2 | 5/2012 | Bilodi et al. | |
| 8,401,186 B2 | 3/2013 | Liu | |
| 8,499,292 B2 | 7/2013 | Andrade et al. | |
| 8,600,062 B2 | 12/2013 | Rae et al. | |
| 8,687,810 B2 | 4/2014 | Bukshpun et al. | |
| 8,701,191 B2 | 4/2014 | Mattsson | |
| 8,935,787 B2 | 1/2015 | Mattsson | |
| 9,342,705 B1 | 5/2016 | Schneider et al. | |
| 9,893,881 B2 | 2/2018 | Bhattacharyya et al. | |
| 10,185,509 B1 * | 1/2019 | Farhan .................. | G06F 3/0652 |
| 10,476,663 B1 | 11/2019 | Lazier et al. | |
| 10,476,846 B2 | 11/2019 | Bentley | |
| 10,552,622 B2 | 2/2020 | Mattsson | |
| 10,608,813 B1 | 3/2020 | Lazier et al. | |
| 10,657,295 B2 | 5/2020 | Su et al. | |
| 11,436,367 B2 * | 9/2022 | Subramanian ...... | G06F 21/6245 |

(Continued)

*Primary Examiner* — Kaushikkumar M Patel
(74) *Attorney, Agent, or Firm* — Simmons Perrine Moyer Bergman PLC

(57) ABSTRACT

A system and method for sanitizing a mass storage device on a host computer which includes a control system which receives input which starts a process of sanitizing a mass storage device, which includes a switch which isolates the mass storage device from an input interface that is used in normal operations and provides signals from an alternate input to the mass storage device to sanitize the mass storage.

20 Claims, 2 Drawing Sheets

(56) References Cited

U.S. PATENT DOCUMENTS

| | | |
|---|---|---|
| 2004/0017918 A1 | 1/2004 | Nicolas |
| 2004/0120521 A1 | 6/2004 | Henson et al. |
| 2006/0041533 A1 | 2/2006 | Koyfman |
| 2006/0177065 A1 | 8/2006 | Halbert |
| 2007/0088947 A1 | 4/2007 | Cross et al. |
| 2007/0226807 A1 | 9/2007 | Ginter et al. |
| 2008/0089516 A1 | 4/2008 | Cocchi et al. |
| 2008/0133935 A1 | 6/2008 | Elovici et al. |
| 2009/0031095 A1* | 1/2009 | Merry, Jr ............... G11C 16/22 711/E12.001 |
| 2010/0211787 A1 | 8/2010 | Bukshpun et al. |
| 2013/0067213 A1 | 3/2013 | Liu |
| 2014/0189359 A1 | 7/2014 | Marien et al. |
| 2014/0201538 A1 | 7/2014 | O'Hare et al. |
| 2014/0325215 A1 | 10/2014 | Wright |
| 2016/0299924 A1 | 10/2016 | Fujimoto et al. |
| 2016/0315763 A1 | 10/2016 | Hammon et al. |
| 2017/0054550 A1 | 2/2017 | Choi et al. |
| 2017/0061151 A1 | 3/2017 | Baessler et al. |
| 2017/0103217 A1 | 4/2017 | Arasu et al. |
| 2017/0288858 A1 | 10/2017 | Hirano et al. |
| 2018/0013735 A1 | 1/2018 | Guo et al. |
| 2019/0324678 A1* | 10/2019 | Griffes ................. H04L 9/0891 |

\* cited by examiner

ISOLATED HARDWARE DATA SANITIZE SYSTEM AND METHOD

CROSS REFERENCE TO RELATED APPLICATIONS

This application claims the benefit of the filing date of the provisional patent application having Ser. No. 63/066,558 filed Aug. 17, 2020, the contents of which is incorporated herein in its entirety by this reference.

FIELD OF THE INVENTION

The present invention relates to computers and more particularly, systems and methods for sanitizing the same, by erasing data from hardware systems when they must be declassified, decommissioned or are physically threatened, or soon to be threatened.

BACKGROUND OF THE INVENTION

Prior art data sanitization schemes were typically either hardware based or software based. Often hardware based sanitization systems and methods would require expensive hardware such as drives or controllers. However, these would normally require that the host computer system be powered on and functioning. Those hardware based systems which utilized custom controllers, such as host-bus-adapters (HBAs), often will require more effort in obtaining certification to prove that the controller devices do not access or intercept sensitive data stored on the drives or in live data transmissions between the storage device and the host system. Similarly, software based sanitization systems often require custom software running on the host computer system which often can be easily defeated.

While data sanitization systems and methods have been successfully accomplished in various ways, but in demanding applications and environments, it has been increasingly an area of concern.

Consequently, there exists a need for improved methods and systems for sanitizing data in a computer platform used in harsh environments, such as military vehicles, weapons platforms, and space launch systems, all done in a reliable and cost efficient manner.

SUMMARY OF THE INVENTION

It is an object of the present invention to provide a system and method for sanitizing data in an efficient manner.

It is a feature of the present invention to not require the host computer to be powered on during sanitization.

It is an advantage of the present invention to reduce occasions of failures to complete requested attempts to properly sanitize data.

It is another feature of the present invention to not require operating system modifications or even the ability to boot the host computer.

It is another feature of the present invention to sanitize data without requiring high cost drives or high power consumption.

It is another advantage of the present invention to provide a system and method that may be able to guarantee data isolation between the controller and sensitive "live" data present during normal operations. It is yet another advantage to permit sanitization with an amount of supplied backup power which is less than that required to operate the host computer.

The present invention is an apparatus and method for sanitizing data so as to satisfy the aforementioned needs, provide the previously stated objects, include the above-listed features, and achieve the already articulated advantages. The present invention is carried out in a "host computer-less" manner in a sense that the failures to sanitize associated with a lack of a functioning host computer have been eliminated.

Accordingly, the present invention is a method for sanitizing data comprising the steps of:
  providing a system mass storage device interface input 120;
  providing a system mass storage device interface output 170;
  providing a mass storage device interface switching device 110 having;
    a mass storage device interface input 144;
    a second mass storage device input 180;
    a mass storage device interface output 111; and
  providing a mass storage device interface switching device control signal input 146, which causes mass storage device interface switching device 110 to:
    isolate mass storage device control commands between non-selected paths; and
    one of:
      pass mass storage device control commands between a first mass storage device control interface input 144 and a mass storage device control output 111; or
      pass mass storage device control commands between a second mass storage device control input 180 and a mass storage device control output 111;
      providing a system control signal input 130 configured to receive operator command input 192;
      providing a system control computer 140, having;
      a central processor unit 141;
      a control signal input, 143 connected to the system control signal input 130;
      a control signal output 145, connected to the mass storage device interface switching device control signal input 146;
      a mass storage device interface 147 connected to a second mass storage device interface input 144 of the mass storage device interface switching device 110;
      a memory device 149 containing computer readable program code having commands which, when executed by the central processing unit, cause the central processing unit to:
      receive an operator command through the system control signal input;
      control the mass storage device interface switching device control signal input;
      issue commands through the mass storage device interface to perform one of:
      mass storage device data erase commands;
      mass storage device cryptographic key scramble commands; and
      mass storage device cryptographic key erase commands.

Accordingly, the present invention is a system to sanitize contents of a mass storage device containing secret information, the system comprising:
  a system mass storage device interface input 120;
  a system mass storage device interface output 170;
  a mass storage device interface switching device 110 having;
    a mass storage device interface input 144;
    a mass storage device interface output 111; and a mass storage device interface switching device control signal input 146, which causes mass storage device interface switching device 110 to:
- isolate mass storage device control commands between non-selected paths; and
- one of:
  - pass mass storage device control commands between a first mass storage device control interface input 144 and a mass storage device control output 111; or
  - pass mass storage device control commands between a second mass storage device control input 180 and a mass storage device control output 111;
- a system control signal input 130 configured to receive operator command input 192;
- a system control computer 140, having;
- a central processor unit 141;
- a control signal input, 143 connected to the system control input 130;
- at least one control signal output 145, connected to the mass storage device interface switching device control signal input 146;
- a mass storage device interface 147 connected to a second mass storage device interface input 144 of the mass storage device interface switching device 110;
- a memory device 149 containing computer readable program code having:
- commands which, when executed by the central processing unit, cause the central processing unit to:
  - receive an operator command through the system control signal input;
  - control the mass storage device interface switching device control signal input;
  - issue commands through the mass storage device interface to perform one of:
    - mass storage device data erase commands;
    - mass storage device cryptographic key scramble commands; and
    - mass storage device cryptographic key erase commands.

BRIEF DESCRIPTION OF THE DRAWINGS

The invention may be more fully understood by reading the following description of the preferred embodiments of the invention, in conjunction with the appended drawing wherein.

DETAILED DESCRIPTION

Though this description details are given of a single circuit card system, it should be understood that different integration implementations could be used with different connections to the host computer and configurations. It is intended that these specific details not limit the scope of the present invention, unless repeated in the claims, but instead fully enable a specific and/or best mode of the invention and other variations of this system and method are intended to be readily understood from the following description and included within the scope and spirit of the present invention.

Figure 1:
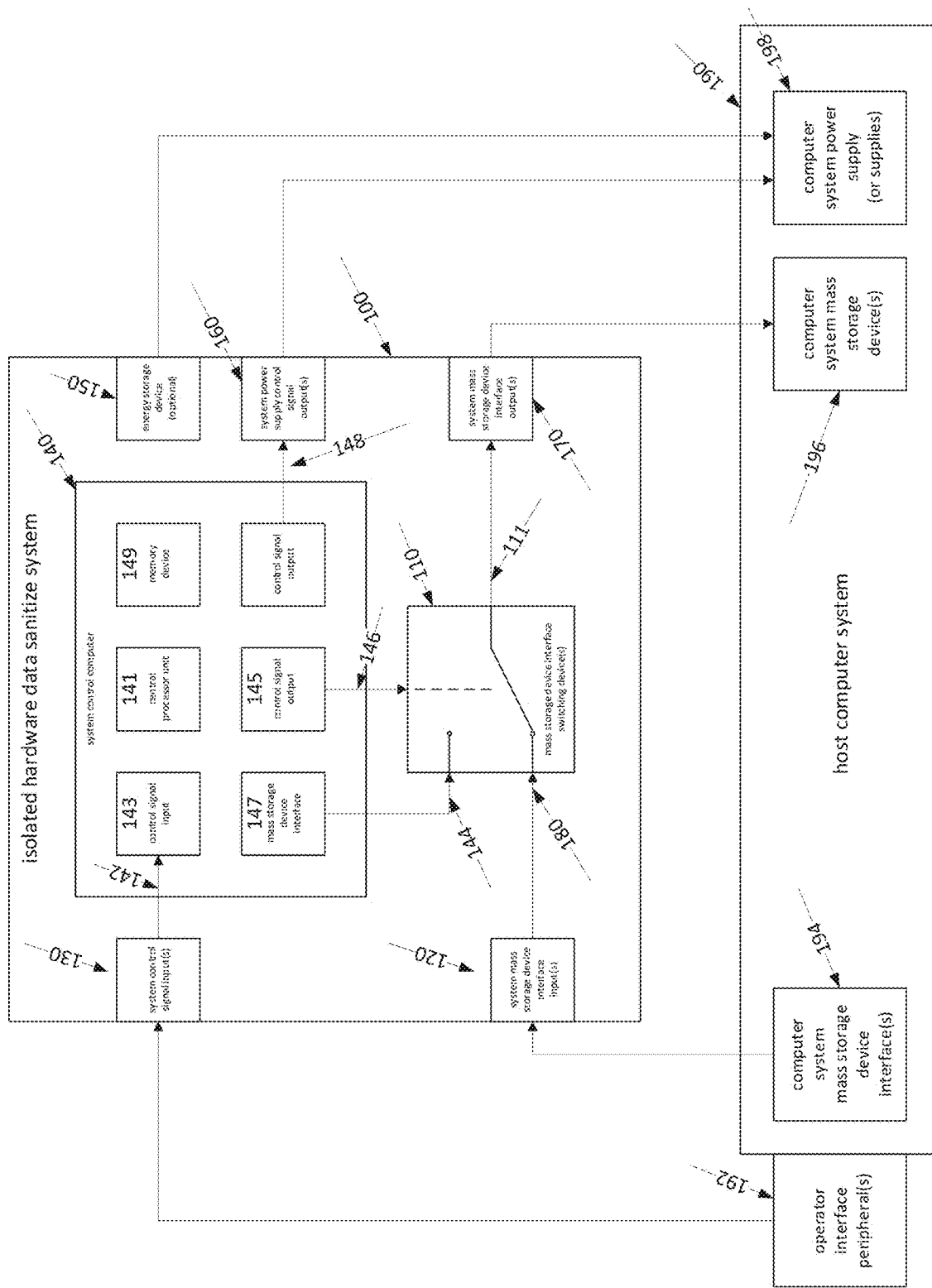
FIG. 1 is a block diagram view of the present invention in its intended environment.
Figure 2:
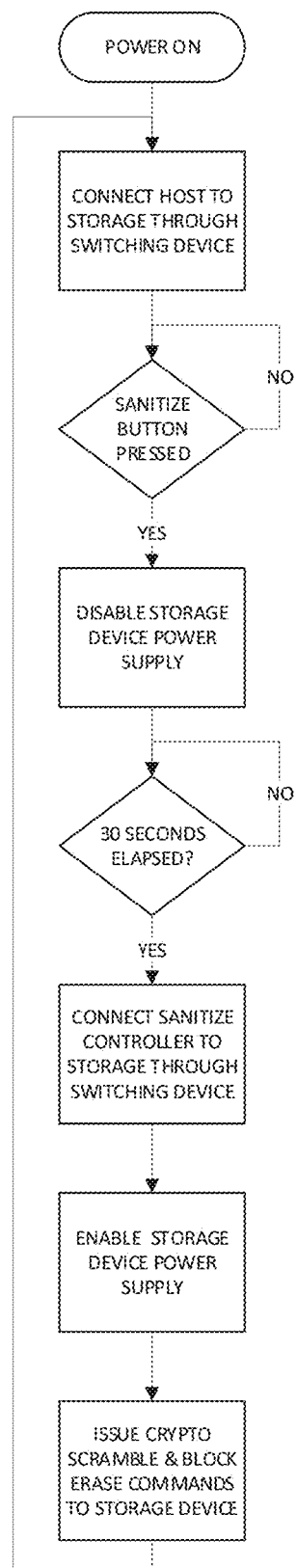
FIG. 2 is a flow chart of a process of sanitizing a mass storage device of the present invention.

Now referring to the FIG. 1, there is shown an isolated hardware data sanitizing system, generally designated 100, of the present invention, which is coupled to a host computer system 190, having an operator interface peripheral(s) 192, computer system mass storage device interface(s) 194, computer system mass storage device interface(s) 196, and computer systems power supply (for supplies) 198.

Operator interface peripheral(s) 192 is coupled to system controls signal inputs 130, which is coupled on line 142 to control signal input. Mass storage device is coupled on line 144 to mass storage device interface switching device(s) 110, which receives signal via line 146 from control signal output. System power supply control signal output(s) (optional) 160 is coupled on line 148 to control signal output (option). System control computer 110 has associated with it an optional energy storage device 150.

In some embodiments, the isolated hardware data sanitize system is a single board computer system designed to be installed within a host computer system's chassis and placed in-line between the mass storage device interfaces 194 of the host computer system 190 and associated mass storage devices 196, associated therewith or disposed therein. The isolated hardware data sanitize system's power supply is derived from the host systems' standby regulator and/or an optional energy storage device 150. When power is first applied to isolated hardware data sanitize system, the system control computer 140 directs the mass storage device interface switching devices 110 to pass mass storage device commands, responses, and data between the mass storage devices and the host computer system's mass storage device interface outputs 194. In other words, during normal operation the host computer system 190 is attached to its storage devices 196 through its mass storage device interfaces 194 through a transparent interface 110, 120, 111, 170 which is isolated from the system control computer's mass storage device interface(s) 147, thus preserving security of the sensitive data. When the operator activates the isolated hardware data sanitize system 100 through a system control signal input 130, the system control computer redirects the interface to the host system's mass storage devices 196 to its own mass storage device interface output(s) 147 and effectively takes complete control of the mass storage devices. Once the mass storage devices have been attached to the system control computer, the system control computer issues commands to the mass storage devices to safeguard any data-at-rest contained within the mass storage devices.

In another embodiment, the isolated hardware data sanitize system is integrated into the host computer system's motherboard and or system circuitry. In this embodiment, the system integration can be performed to reduce system cost, to increase system security, and other parameters specific to the intended mission of the system.

The specific commands that the system control computer issues to the mass storage devices when the isolated hardware data sanitize system is activated (e.g. data erase, cryptographic key erase, cryptographic key scramble) vary by mission parameters and from one embodiment to another. In some embodiments, the mass storage devices are self-encrypting solid-state disk drives wherein controllers embedded in the drives perform the cryptographic operations and implement the sanitization commands. In other embodiments, the mass storage devices do not support self-encrypting operations, in which case the system control computer is responsible for issuing other commands (e.g. write data) to erase the data contained within the mass storage devices.

In some embodiments, the system control signal input is a simple button mounted to or integrated into the chassis of the host computer system such that it is accessible to the operator. In other embodiments, the control signal input is comprised of two buttons requiring the user to press both at once to activate the system. In another embodiment, the control signal input is a key-switch mounted on or integrated within the host computer chassis. In other embodiments, the system control signal input is obtained from a secondary isolated hardware data sanitize system allowing one system control input to activate multiple isolated hardware data sanitize systems, thus increasing the number and/or allowing multiple types of mass storage devices to be managed through a signal operator control.

In another embodiment, the system control signal input is itself an embedded computer system with user interface elements and locations selected to best meet the mission profile (e.g. LCD, keypad). In other embodiments, an entire rack of host computing systems may be attached together to a common sanitize activation button or control. In other embodiments, one or several control signal inputs are connected to chassis, rack, or facility intrusion switch(es) instead of or in addition to the above-described embodiments, which cause the activation of the data sanitization process if the host computer system chassis, rack, or facility is breached and/or by operator command.

In another embodiment, the isolated hardware data sanitize system utilizes the optional system power supply control signal output. The addition of this output signal allows the system control computer to control the host system's power supply which in turn allows data-at-rest management when the host computer system is powered down and also allows the system control computer to perform a power cycle on the mass storage devices as is required for certain conditions (e.g. recovery from self-encrypting drive security freeze).

Embodiments of the isolated hardware data sanitize system when incorporating the energy storage device can utilize a wide variety of energy storage technologies. The specific technology varies by embodiment and by mission parameters. Embodiments may utilize, but are not limited to, the following energy storage technologies: electric capacitors, electro-chemical cells (i.e. batteries, both primary and secondary), fuel cells, engine/generator systems, radio-thermal generators, and combinations thereof.

In some embodiments, the mass storage device interface switching devices is implemented using semiconductor based technologies. In other embodiments, the mass storage device interface switching devices is implemented using electro-magnetic actuators (e.g. relays). In other embodiments, the mass storage device interface switching devices is implemented using optical switching technologies. Certain embodiments utilize multi-channel semiconductor switching devices.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A method for sanitizing data comprising the steps of:
providing a system mass storage device interface input;
providing a system mass storage device interface output;
providing a mass storage device interface switching device having;
a mass storage device control interface first input;
a second mass storage device input;
a mass storage device interface switching device output; and
providing a mass storage device interface switching device control signal input, which causes mass storage device interface switching device to:
isolate mass storage device control commands between non-selected paths; and
one of:
pass mass storage device control commands between a mass storage device control interface first input and a mass storage device interface switching device output; or
pass mass storage device control commands between a mass storage device control interface second input and a mass storage device interface switching device output;
providing a system control signal input configured to receive operator command input;
providing a system control computer, having;
a central processor unit;
a control signal input, connected to the system control signal input;
a control signal output, connected to the mass storage device interface switching device control signal input;
a mass storage device interface connected to a second mass storage device control interface input of the mass storage device interface switching device;
a memory device containing computer readable program code having commands which, when executed by the central processing unit, cause the central processing unit to:
receive an operator command through the system control signal input;
control the mass storage device interface switching device control signal input;
issue commands through the mass storage device in to perform one of:
mass storage device data erase commands;
mass storage device cryptographic key scramble commands; and
mass storage device cryptographic key erase commands.

2. The method of claim 1, wherein the mass storage device interface and the mass storage device interface switching device support bi-directional commands and responses.

3. The method of claim 1, wherein the mass storage device interface and the mass storage device interface switching device support differential signaling techniques.

4. The method of claim 1, wherein the mass storage device interface and the mass storage device interface switching device support serial signaling techniques.

5. The method of claim 1, wherein the system control computer and the mass storage device interface switching device are integrated into a device.

6. The method of claim 1, containing an energy storage device, the energy storage device being incorporated to supply electrical energy to the isolated hardware sanitize system, a mass storage device, and an operator interface peripherals, enabling the isolated hardware data sanitize system to issue commands to the mass storage device without requiring an external system power source.

7. The method of claim 1, containing a system power supply control signal output, the system power supply control signal output connected to a control signal output of the central control computer, the computer readable program code containing additional commands which, when executed by the central processing unit, cause the central processing unit to control the system power supply control signal output.

8. The method of claim 1, wherein some of all of the components of the system control computer and the mass storage device interface switching device(s) are integrated into the host computer system.

9. A method of sanitizing a mass storage device comprising the steps of:
connect a host computer to a storage device through a switching device:
press a button to initiate a sanitization process on said storage device;
disable storage device power supply;
wait a predetermined time period;
connect a sanitize controller to said storage device through the switching device;
enable storage device power supply; and
issue crypto scramble and block erase commands to said storage device.

10. The method of claim 9 wherein said switching device includes:
a mass storage device interface switching device having;
a mass storage device interface input;
a mass storage device interface output; and
a mass storage device interface switching device control signal input, which causes mass storage device interface switching device to:
isolate mass storage device control commands between non-selected paths; and
one of:
pass mass storage device control commands between a first mass storage device control interface input and a mass storage device control output; or
pass mass storage device control commands between a second mass storage device control input and a mass storage device control output.

11. A system to sanitize contents of a mass storage device containing secret information, the system comprising:
a system mass storage device interface input;
a system mass storage device interface output;
a mass storage device interface switching device having;
a mass storage device control interface first input;
a mass storage device interface switching device output; and
a mass storage device interface switching device control signal input, which causes mass storage device interface switching device to:
isolate mass storage device control commands between non-selected paths; and
one of:
pass mass storage device control commands between the mass storage device control interface input and the mass storage device interface switching device output; or
pass mass storage device control commands between a mass storage device control interface second input and a mass storage device control output;
a system control signal input configured to receive operator command input;
a system control computer, having;
a central processor unit;
a control signal input, connected to the system control signal input;
at least one control signal output, connected to the mass storage device interface switching device control signal input;
a mass storage device interface connected to a second mass storage device interface second input of the mass storage device interface switching device;
a memory device containing computer readable program code having:
commands which, when executed by the central processing unit, cause the central processing unit to:
receive an operator command through the system control signal input;
control the mass storage device interface switching device control signal input;
issue commands through the mass storage device interface to perform one of:
mass storage device data erase commands;
mass storage device cryptographic key scramble commands; and
mass storage device cryptographic key erase commands.

12. The system of claim 11, wherein the mass storage device interface and the mass storage device interface switching device support bi-directional commands and responses.

13. The system of claim 11, wherein the mass storage device interface and the mass storage device interface switching device support differential signaling techniques.

14. The system of claim 11, wherein the mass storage device interface and the mass storage device interface switching device support serial signaling techniques.

15. The system of claim 11, wherein some the system control computer and the mass storage device interface switching device are integrated into at least one device.

16. The system of claim 11, containing an energy storage device, the energy storage device being incorporated to supply electrical energy to the isolated hardware sanitize system, a mass storage device, and an operator interface peripherals, enabling the isolated hardware data sanitize system to issue commands to the mass storage device without requiring an external system power source.

17. The system of claim 11, containing a system power supply control signal output, the system power supply control signal output connected to a control signal output of the central control computer, the computer readable program code containing additional commands which, when executed by the central processing unit, cause the central processing unit to control the system power supply control signal output.

18. The system of claim 11, wherein the system control computer and the mass storage device interface switching device(s) are integrated into the host computer system.

19. The system of claim 11 wherein the step of:
issue commands through the mass storage device interface to perform one of:
mass storage device data erase commands;
mass storage device cryptographic key scramble commands; and
mass storage device cryptographic key erase commands;
is a step of issue commands through the mass storage device interface to perform two of:
mass storage device data erase commands;
mass storage device cryptographic key scramble commands; and
mass storage device cryptographic key erase commands.

20. The system of claim 11 wherein the step of:
issue commands through the mass storage device interface to perform one of:

mass storage device data erase commands;
mass storage device cryptographic key scramble commands; and
mass storage device cryptographic key erase commands;
is a step of issue commands through the mass storage device interface to perform three of:
mass storage device data erase commands;
mass storage device cryptographic key scramble commands; and
mass storage device cryptographic key erase commands.

\* \* \* \* \*